March 28, 1944.  J. W. SMITH  2,345,508
BEARING FOR PAPER DRYER CYLINDERS
Filed July 30, 1942
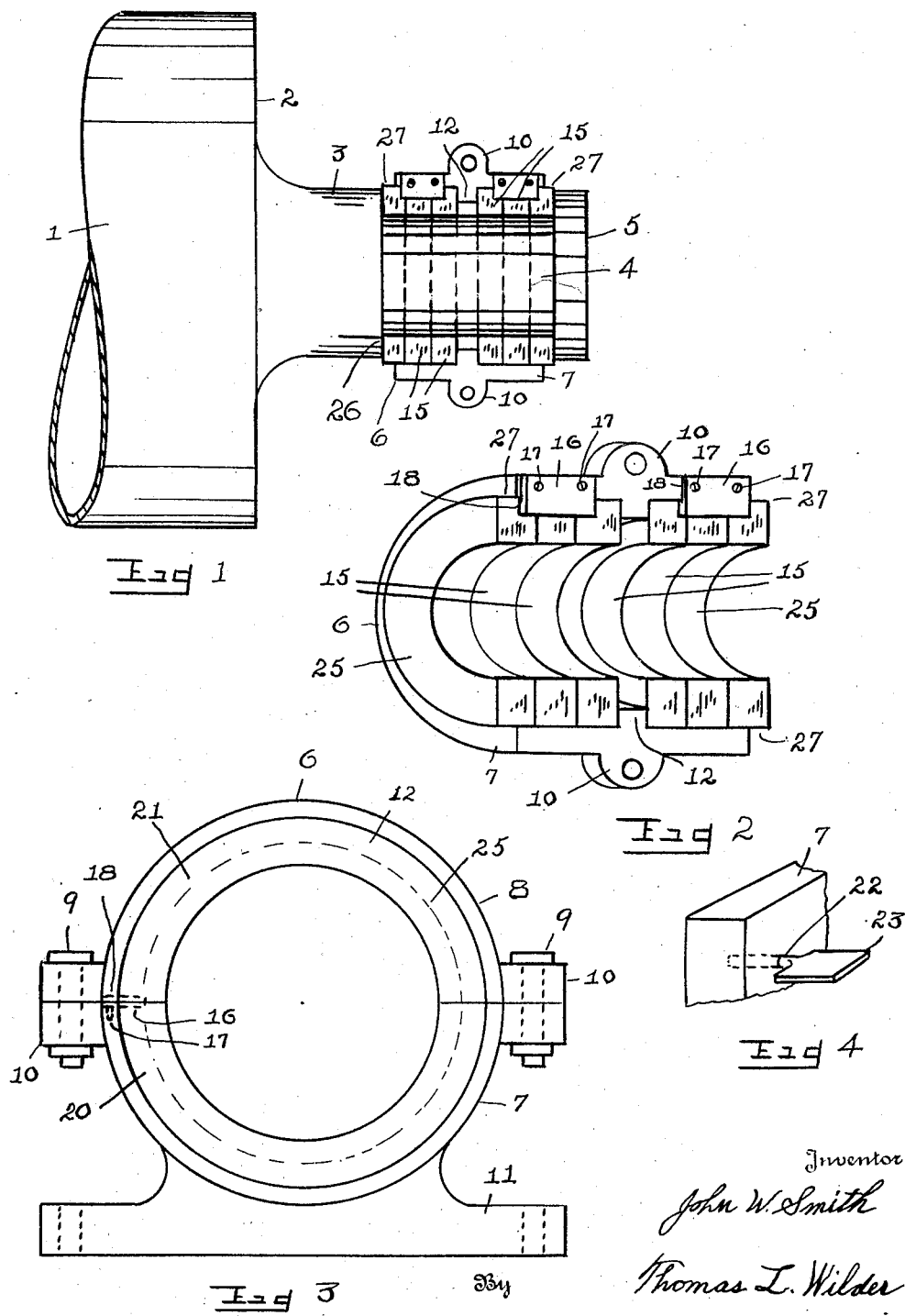
Inventor
John W. Smith
Thomas L. Wilder
Attorney
By Patented Mar. 28, 1944

2,345,508

UNITED STATES PATENT OFFICE 2,345,508

BEARING FOR PAPER DRIER CYLINDERS

John W. Smith, Carthage, N. Y.

Application July 30, 1942, Serial No. 452,966

1 Claim. (Cl. 308—240)

My invention relates to bearing for paper drier cylinders and I declare the following to be a full, clear, concise and exact description thereof sufficient to enable any one skilled in the art to which it appertains to make and use the same, reference being had to the accompanying drawing in which like reference characters refer to like parts throughout the specification.

The object of the invention is to provide a bearing in which it will not be necessary to use oil for lubrication. Heretofore, the oil from the bearing has sprayed on the felt that carries the paper from cylinder to cylinder and rotted the same.

The present invention needs no lubrication. It consists in place of lubrication, rings made of a carbon and graphite composition that reduced friction to a greater extent than lubrication such as oil would do. Furthermore, the hotter the carbon graphite bearing becomes the less friction there would be. This is due to the fact that a gloss is created on the inner surface of the carbon rings.

The object will be understood by referring to the drawing in which

Fig. 1 shows a plane view of the drier cylinder with a bearing applied thereto, parts being broken away.

Fig. 2 is an enlarged detail view showing a perspective in section of the graphite bearing.

Fig. 3 is an enlarged view showing elevation of the bearing.

Fig. 4 is a detail view enlarged showing a perspective of a modified form of ring retaining pin and immediate part broken away for holding the rings from turning.

Referring more particularly to the drawing, a drier cylinder used in making paper is represented at 1. A shaft or journal formed integral with the end 2 of cylinder 1 is shown at 3. Shaft 3 is reduced at 4 and has a head 5 formed on the free end thereof.

The novel bearing for supporting shaft 3 comprises the outer annular shell 6 made in two parts 7 and 8 that are bolted together at 9, 9. Said bolts pass through extensions or lips 10, 10 that are made integral with parts 7 and 8. The lower part 7 of shell 6 has formed integral therewith a base 11 which is bolted to any suitable standard, not shown. The lower part 7 and upper part 8 of shell 6 have formed integral therewith an annular ridge 12 that extends inwardly from the inner surfaces of parts 7 and 8 and it is located about the middle of the longitudinal length of parts 7 and 8. Ridge 12 is designed to prevent the annular bearing rings 15, which are also made or cut in two equal annular parts, from moving longitudinally with respect to the shell 6. It is about half the thickness of rings 15.

Said annular bearing rings 15 are made of a composition of carbon and graphite, whereby to eliminate the necessity of using oil for lubricating the bearing. In fact the hotter the carbon graphite rings 15 become the less friction the contacting surfaces will have owing to a gloss that forms on the inner surface of rings 15.

The means for preventing rings 15 from turning with shaft 3 contemplates plates 16, 16 bolted at 17, 17 to lower part 7 of shell 6 and on one side only. Plates 16 rest in recesses 18 made in parts 7 and 8 of shell 6 and aligned recesses made in the co-operating parts 20 and 21 of rings 15.

In place of plates 16 pins 22 having flat outer surfaces 23 may be projected with a tight fit into suitable apertures made in either lower or upper parts 7 and 8 of shell 6 as shown in detail in Fig. 4.

End rings 25, 25 project beyond the outer perimeter of shell 6 at 27 whereby to form thrust bearings for contacting the shoulder 26 of journal or the shaft 3 on one side and the head 5 of journal 3 on the other.

In operation, the carbon graphite rings 15 which are made or cut as above stated in two equal annular parts are assembled in the parts 7 and 8 of outer shell 6 journal 3 on either side of ridge 12 and then parts 7 and 8 clamped in position about the reduced part and of journal 3 by applying bolts 9, 9 to hold them in place. The bearing thus formed will serve indefinitely without the use of a lubricant.

There are six of the carbon graphite rings 15 shown in the drawing. They are made independent of each other whereby to anticipate localized wear thereon. In the event that wear occurs at any particular part the ring where such wear occurs can be replaced by a new ring 15. Although I have described rings 15 as made in two parts they made be made in one part to form a complete circle.

Having thus described my invention what I claim as new and desire to secure by Letters Patent is as follows:

In a bearing for paper drier cylinders, a series of independent rings made of a composition of carbon and graphite, a supporting shell for said rings, an annular centrally disposed ridge on said shell to prevent said rings from moving longitudinally, pins having flat surfaces attached to said bearing for preventing rotation of said rings and certain of said rings extended beyond said bearing to form thrust bearings.

JOHN W. SMITH.